(12) United States Patent
Corghi

(10) Patent No.: US 7,108,035 B2
(45) Date of Patent: Sep. 19, 2006

(54) BEAD BREAKER DEVICE

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 11/134,456

(22) Filed: May 23, 2005

(65) Prior Publication Data

US 2005/0274461 A1 Dec. 15, 2005

(30) Foreign Application Priority Data

Jun. 15, 2004 (IT) ...................... RE2004A000072

(51) Int. Cl.
*B60C 25/135* (2006.01)
(52) U.S. Cl. ..................... 157/1.17; 157/1.1; 157/1.26; 157/1.35; 157/1.46; 157/1.49
(58) Field of Classification Search ................. 157/1.1, 157/1.17, 1.26, 1.35, 1.46, 1.49
See application file for complete search history.

(56) References Cited

U.S. PATENT DOCUMENTS

| 5,226,465 A | * | 7/1993 | Schon et al. ............... 157/1.28 |
| 2001/0042601 A1 | * | 11/2001 | Corghi ...................... 157/1.26 |

FOREIGN PATENT DOCUMENTS

| EP | 1 155 880 A2 | 11/2001 |
| EP | 1 155 880 A3 | 11/2001 |
| EP | 1 157 860 A2 | 11/2001 |
| EP | 1 157 860 A3 | 11/2001 |
| EP | 1 177 920 A2 | 2/2002 |
| EP | 1 177 920 A3 | 2/2002 |
| EP | 1 334 846 A2 | 8/2003 |
| EP | 1 334 846 A3 | 8/2003 |

* cited by examiner

*Primary Examiner*—Lee D. Wilson
*Assistant Examiner*—Shantese L. McDonald
(74) *Attorney, Agent, or Firm*—Browdy and Neimark, PLLC

(57) ABSTRACT

A bead breaker device (1) having an arm (2) able to slide horizontally along a sliding axis (X—X), in a pipe (3) supported so that it can slide vertically on a post (4) projecting cantilevered from a base; an orientable bead breaker tool (10) associated with an end of said arm (2) and suitable for breaking the bead of a tire of a wheel removably fixed onto rotary support and locking apparatus of the rim; an actuating device (14, 15, 17) suitable for orienting said tool (10) between a first thrusting configuration and a second penetration configuration, said actuating device (14, 15, 17) including a thrusting body (14) and an elastic element (17) cooperating with said tool (10), said thrusting body (14) being able to be actuated between a first extension position against the action of said elastic element (17) and a second release position in which the force exerted by said elastic element (17) prevails.

16 Claims, 6 Drawing Sheets

BEAD BREAKER DEVICE

BACKGROUND OF THE INVENTION

1. Technical Field of the Invention

The present invention is directed to a bead breaker device for detaching the bead of a tire from the corresponding rim of a wheel (rim and tire mounted) for automobiles, capable of operating in a wide range of sizes of the diameter of the rim of the wheel through simple operations.

2. Prior Art

As known, the assembly and disassembly of tires onto and from the respective rims is carried out through tire-dismounting machines that we shall avoid describing in greater detail hereafter since they are already known to men skilled in the art.

It is also known that so as to be able to carry out the dismounting of the tire, the bead, i.e. the reinforced edge of the tire, must first be detached from the bead-locking edge of the rim.

Said detachment operation is carried out through devices, known a bead breakers, which are generally arranged on the tire dismounting machines.

The bead breaking of a tire is carried out by a bead breaking tool, also known as a disc, which in a first step must apply a pressure force against the sides of the tire, in order to detach the corresponding bead portion, and in a second step it must penetrate into the rim positioning itself between the edge of the rim and the bead, in order to allow the complete bead breaking of the tire put into rotation.

Basically, the disc carries out the aforementioned two steps substantially taking up two configurations, for thrusting and penetration, respectively.

Known bead breakers are often equipped with systems for moving the disc that are extremely complex and expensive from the constructive point of view, like for example cylinder-piston groups and complex articulation systems that, when actuated, allow the disc to pass from the thrusting configuration to the penetration configuration and vice-versa.

Of course, the bead breaking operation must be carried out on the two opposite sides of each tire, and therefore the simplest known solution is that which foresees the wheel being tilted at the end of the bead breaking operation carried out on one side.

Unfortunately, this solution has numerous drawbacks, above all with wheels having a large diameter and/or large weight.

According to a solution of the prior art it is possible to foresee the use of two bead breaker devices operating on the respective sides of the tire.

Unfortunately, this solution also implies some drawbacks and disadvantages, since the constructive complexity is substantially duplicated with a substantial increase in costs.

Therefore, there is a strong requirement to have a bead breaker device that is simple to make and effective in use and that, through simple operations, can move the disc from the thrusting configuration to the penetration configuration and vice-versa.

OBJECT AND SUMMARY OF THE INVENTION

The purpose of the present invention is that of providing a bead breaker device having structural and functional characteristics such as to satisfy the aforementioned requirements and at the same time to avoid the aforementioned drawbacks with reference to the prior art. A further purpose is that of allowing the bead breaker device to break the bead on both sides of a wheel without needing to tilt it through operations that are easy to carry out without requiring excessive costs to carry out it.

Further characteristics and advantages of the invention shall become clear from reading the following description provided as an example and not for limiting purposes, with the help of the figures illustrated in the attached tables, in which.

DETAILED DECRIPTION OF THE PREFERRED EMBODIMENT(S) OF THE INVENTION

Figure 1:
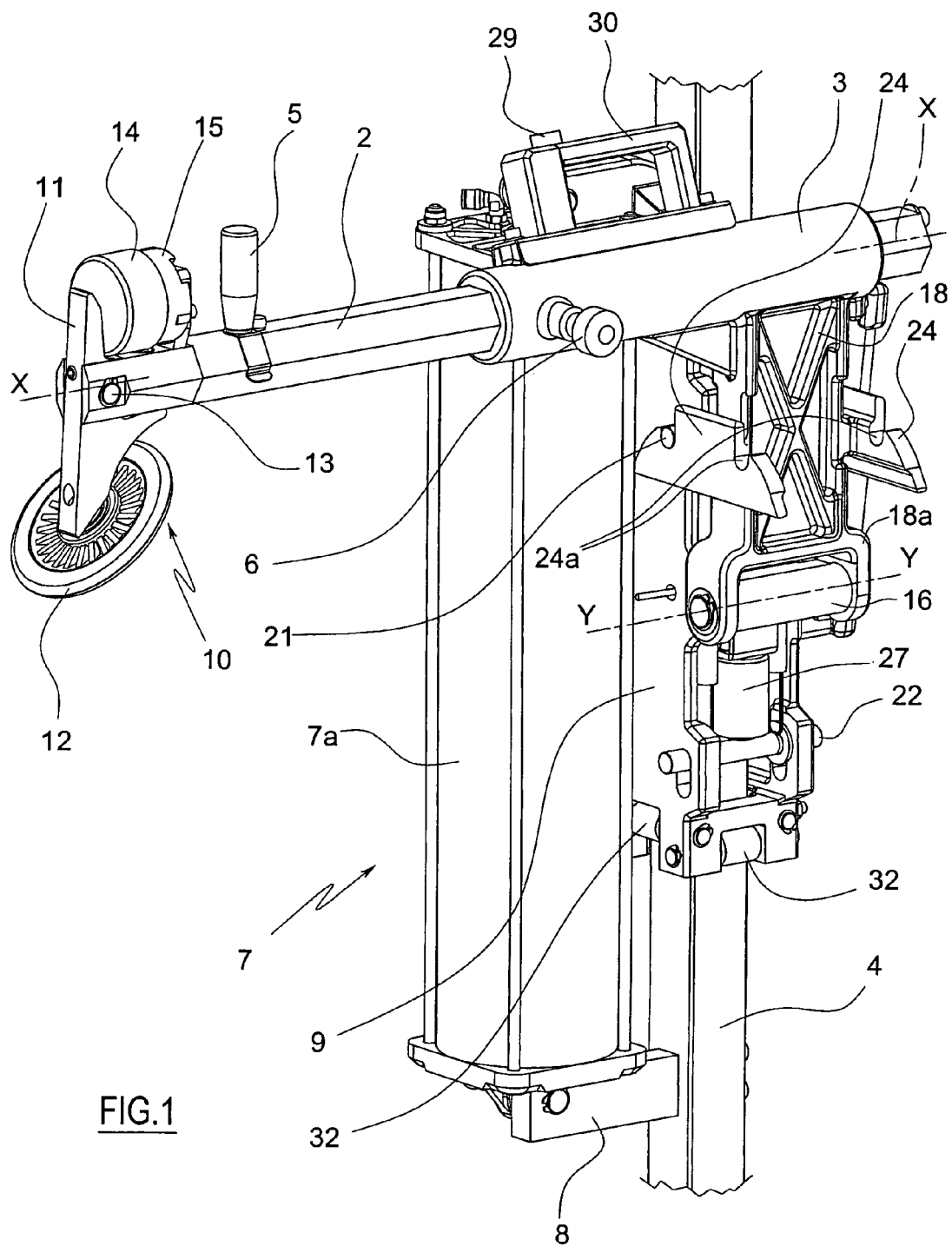
FIG. 1 shows an axonometric view of a bead breaker device in accordance with the present invention.

With reference to the aforementioned figures, a bead breaker device in accordance with the present invention is globally indicated with 1.

Said bead breaker device 1 comprises an arm 2 able to slide horizontally along a sliding axis X—X, in a pipe 3 supported so that it can slide vertically on a pole 4 projecting cantilevered from a base (not illustrated).

In the illustrated example, the arm 2 has a hexagonal prismatic cross section to avoid it rotating about the sliding axis X—X and is equipped at one end with a sleeve 5 on which the thrust is exerted to obtain the desired sliding.

A locking/unlocking device 6 is associated with the pipe, suitable for allowing or preventing the sliding of the arm 2.

The vertical sliding along the post 4 of the pipe-arm group 3, 2 is ensured by a jack 7 having a cylinder 7a and a stem 7b extending parallel to the post 4. The jack 7 is engaged on a support cross-member 8 fixed to the post 4.

The pipe 3 is engaged on the upper end of the stem 7b of the jack 7 through the interposition of a sled 9 provided with idle pins 32 that ensure the sliding along the post 4.

Figure 5:
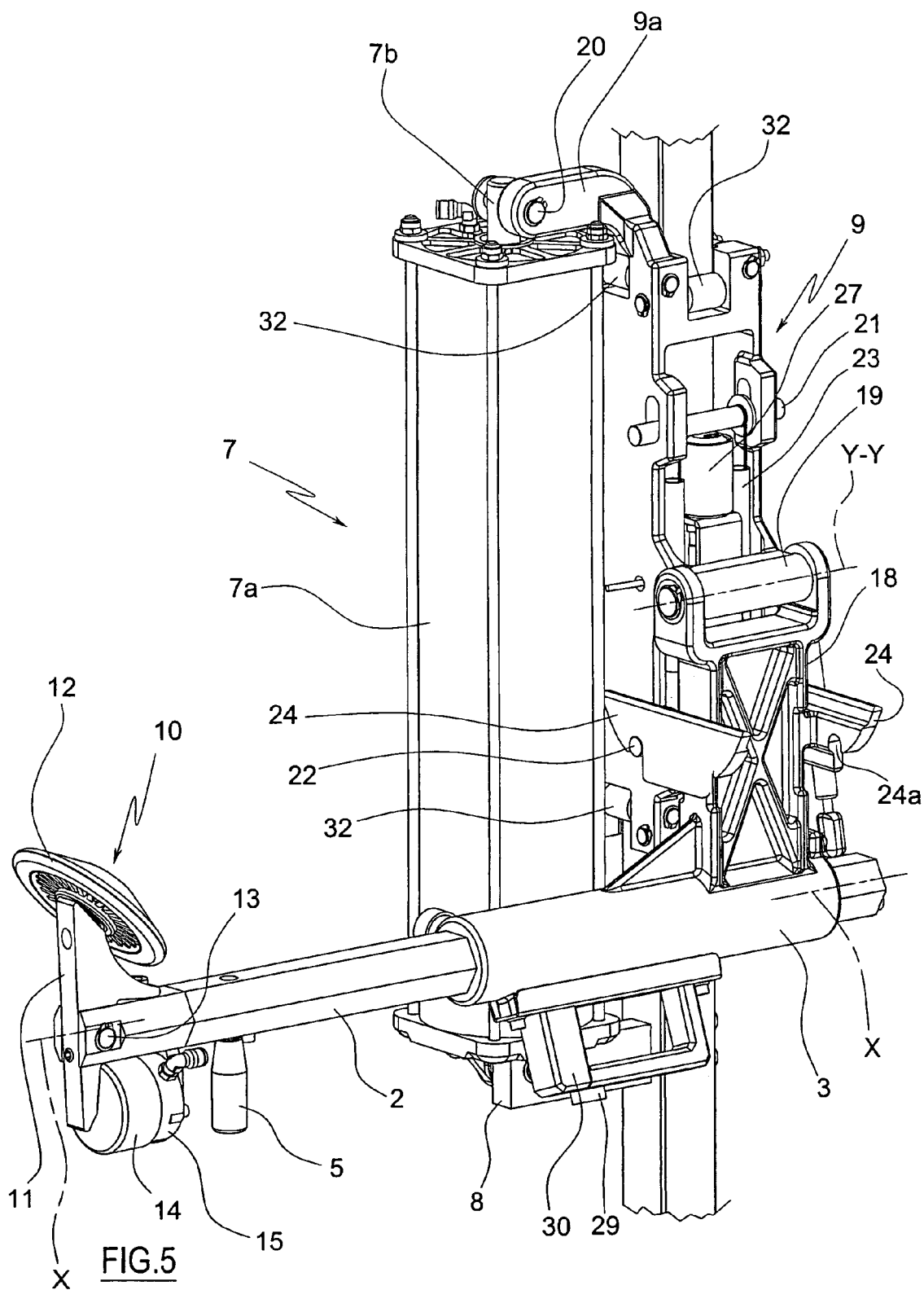
FIG. 5 shows an axonometric view of the device of FIG. 1 in the tilted position.

At the upper end, the sled 9 is provided with a bracket 9a associated with the end of the stem 7b of the jack 7 through a trunnion 20 (FIG. 5).

An orientable bead breaker device 10, suitable for breaking the bead of a tire of a wheel removably fixed onto a rotary support and locking device of the rim (not illustrated), is associated with the end close to the sleeve 5 of the arm 2.

Figure 3:
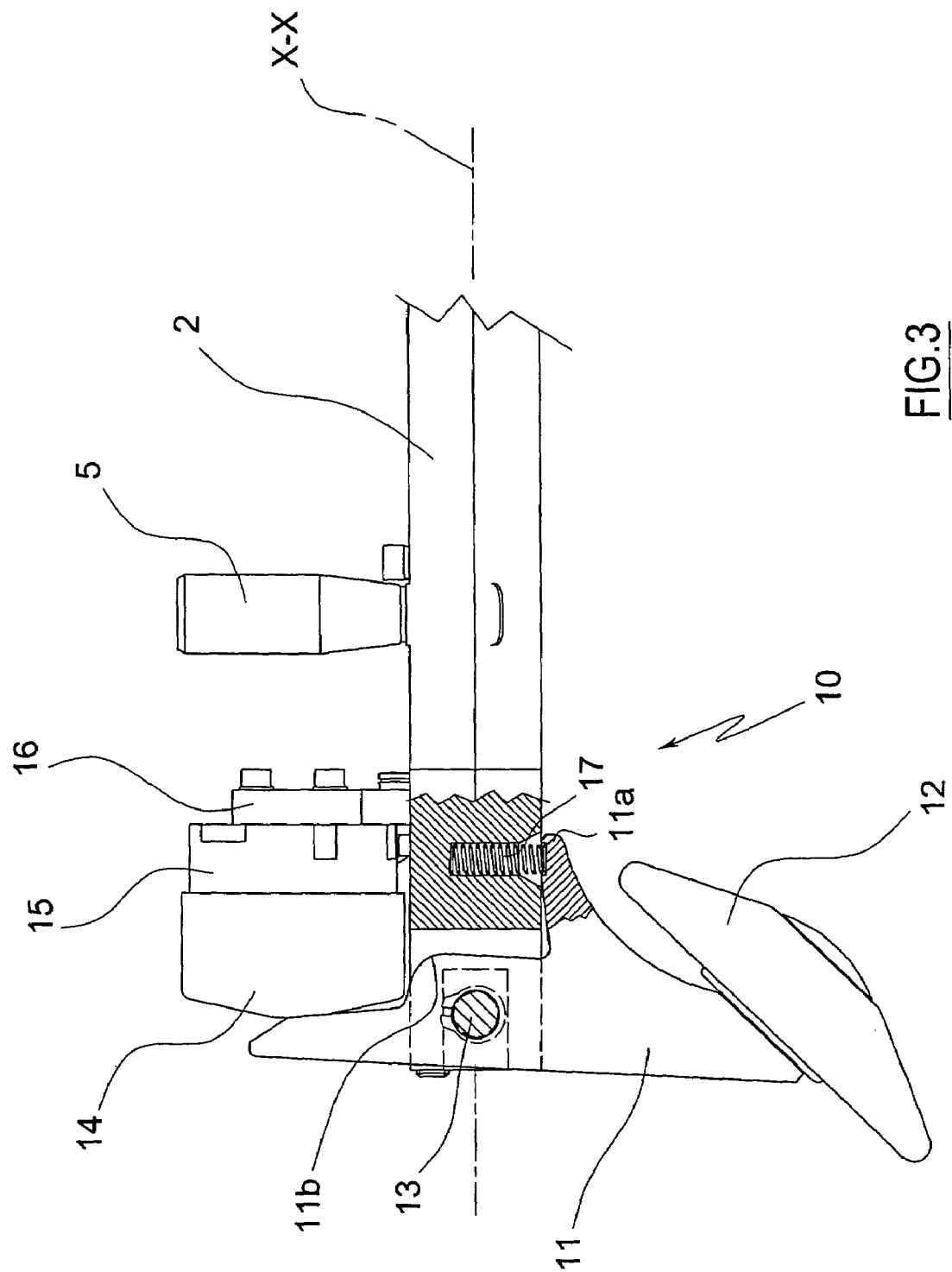
FIGS. 3 and 4 show a detail of the device of FIG. 1, respectively in a first thrusting configuration and a second penetration configuration.
Figure 4:
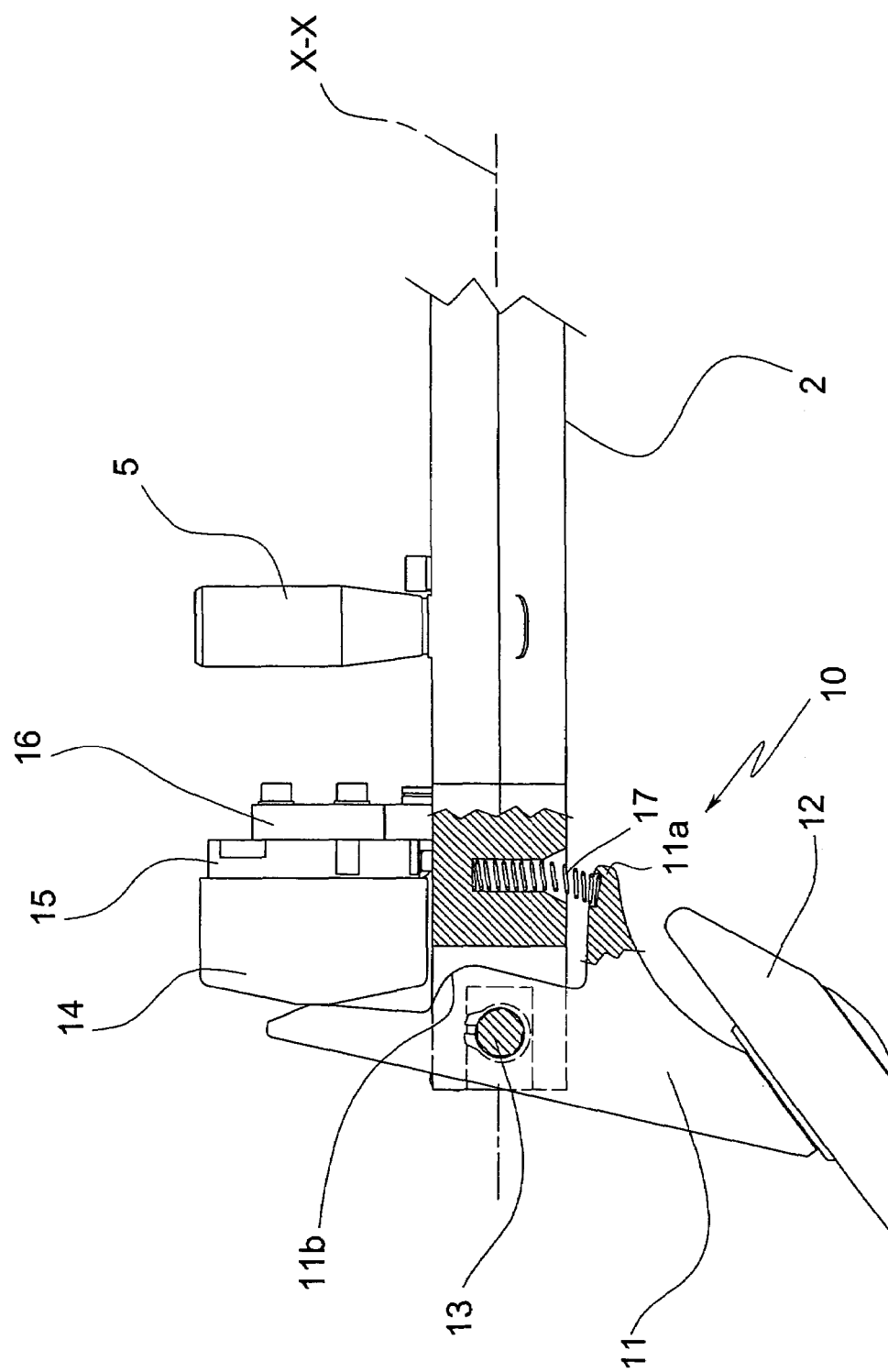

The tool 10 is orientable between a first thrusting configuration, illustrated in FIG. 3, and a second penetration configuration, illustrated in FIG. 4 through suitable actuation means, which shall be discussed hereafter.

In accordance with the present invention, the tool 10 comprises an oblong support body 11 rotatably associated with the end of the arm 2 and a disc 12 fixed to an end of the support body 11, suitable for cooperating with the bead of the tire.

The support body 11 of the disc 12 tilts about an articulation pin 13 arranged horizontally and perpendicular to the sliding axis X—X, as can clearly be seen in the figures.

The actuation means comprise a thrusting body 14 and an elastic element, such as a spring 17, cooperating with the tool.

In the example, the end if the support of the support body 11 opposite the one where the disc engages the thrusting body 14 actuated by a cylinder-piston group 15 between a first extension position (FIG. 3) in which the tool 10 is forced into the first thrusting configuration against the action of the return spring 17 and a second release position (FIG. 4) in which the tool 10 goes into the second penetration configuration under the action of the spring 17.

In the example, the end of the support body 11 opposite the one where the disc engages the thrusting body 14 actuated by a cylinder-piston group 15 between a first extension position (FIG. 3) in which the tool 10 is forced into the first thrusting configuration against the action of the return spring 17 and a second release position (FIG. 4) in which the tool 10 goes into the second penetration configuration under the action of the spring 17.

In the example, the cylinder-piston group 15 actuating the thrusting body 14 is in the form of a pneumatic jack arranged parallel to the axis X—X and fixed to a plate 16 cantilevered from the sliding arm 2 near to the tool 10.

Basically, the end opposite the disc 12 of the support body 11 is constantly in abutment against the thrusting body 14 that is actuated parallel to the axis X—X by the jack 15, against the spring 17, in order to ensure the thrusting position of the tool 10.

The spring 17, which pushes the tool 10 back into the penetration position once the action of the jack 15 on the thrusting body 14 has stopped, is inserted with a tight fit into a blind recess formed at the end of the arm 2.

Said spring 17 is arranged vertically and perpendicular to the sliding axis X—X of the arm 2, i.e. perpendicular to the axis of the articulation pin 13.

In order to ensure an effective action of the spring 17 on the support body 11 of the disc 12, said support body 11 is provided with a nose 11a, extending along the sliding axis X—X, arranged in abutment against the spring 17.

In addition, the support body 11 of the disc 12 can have a central projection 11b (FIGS. 3, 4) that goes into abutment against the end of the arm 2 acting as a limit switch, when the tool 10 is in the penetration position.

Tilting apparatus allow the rotation of the arm 2 about a rotation axis Y—Y parallel to and distal from the sliding axis X—X.

In the example, the tilting apparatus comprise a tilting frame 18 hinged at a forked end thereof 18a to the sled 9 through an articulation pin 19 extending along the rotation axis Y—Y and at the other end associated with the pipe 3 and engagement and disengagement devices respectively suitable for locking the frame 18 in a work position and for unlocking the same frame to allow it to tilt.

The engagement device includes an upper fastening pin 21 and a lower fastening pin 22 having the respective axes extending parallel and symmetrically to said rotation axis Y—Y, at least one return spring 23 placed between the two fastening pins 21, 22 and at least one fastening body 24 associated with the tilting frame 18.

The fastening pins 21, 22 are each slidably inserted in a respective pair of opposite slots 25, 26 formed laterally on the sled 9 and extending vertically for a limited portion.

In the example, the at least one return spring 23 are two helical torsion springs 23 arranged vertically and inside the sled 9 and having the ends attached to the fastening pins 21, 22.

Basically, the springs 23 apply a force drawing the fastening pins 21, 22 towards each other, up to the limit switch allowed by the slots 25, 26.

The fastening bodies 24, two in number, are integrally associated on opposite sides with the tilting frame 18 and each of them is provided with a pair of U-shaped grooves 24a suitable for alternately engaging with the ends of the fastening pins 21, 22 that come out from the slots 25, 26 of the sled 9.

Basically, when the pair of fastening bodies 24 is attached to the upper pin 21, the lower pin 22 remains free and vice-versa.

Figure 6:
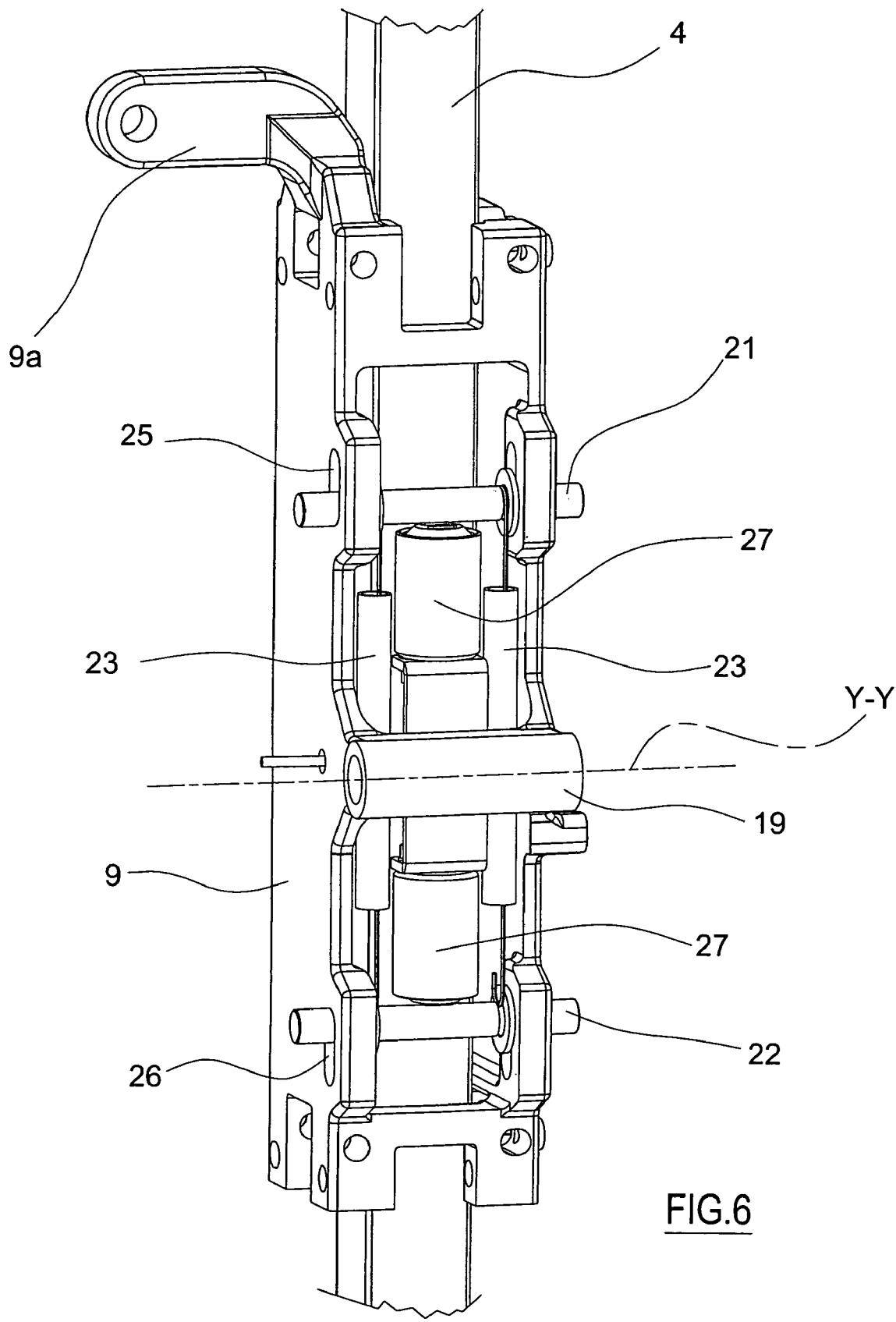
FIG. 6 shows a detail of the fastening/unfastening system.

In order to allow the detachment of the fastening bodies 24 from the fastening pin to which they are attached and the subsequent tilting of the frame 18, the disengagement device is actuated, which preferably comprise a pair of opposite jacks 27 fixed on the inside to the sled 9, respectively cooperating with the upper fastening pin 21 and lower fastening pin 22 and able to be actuated against the return springs 23 (FIG. 6).

Figure 2:
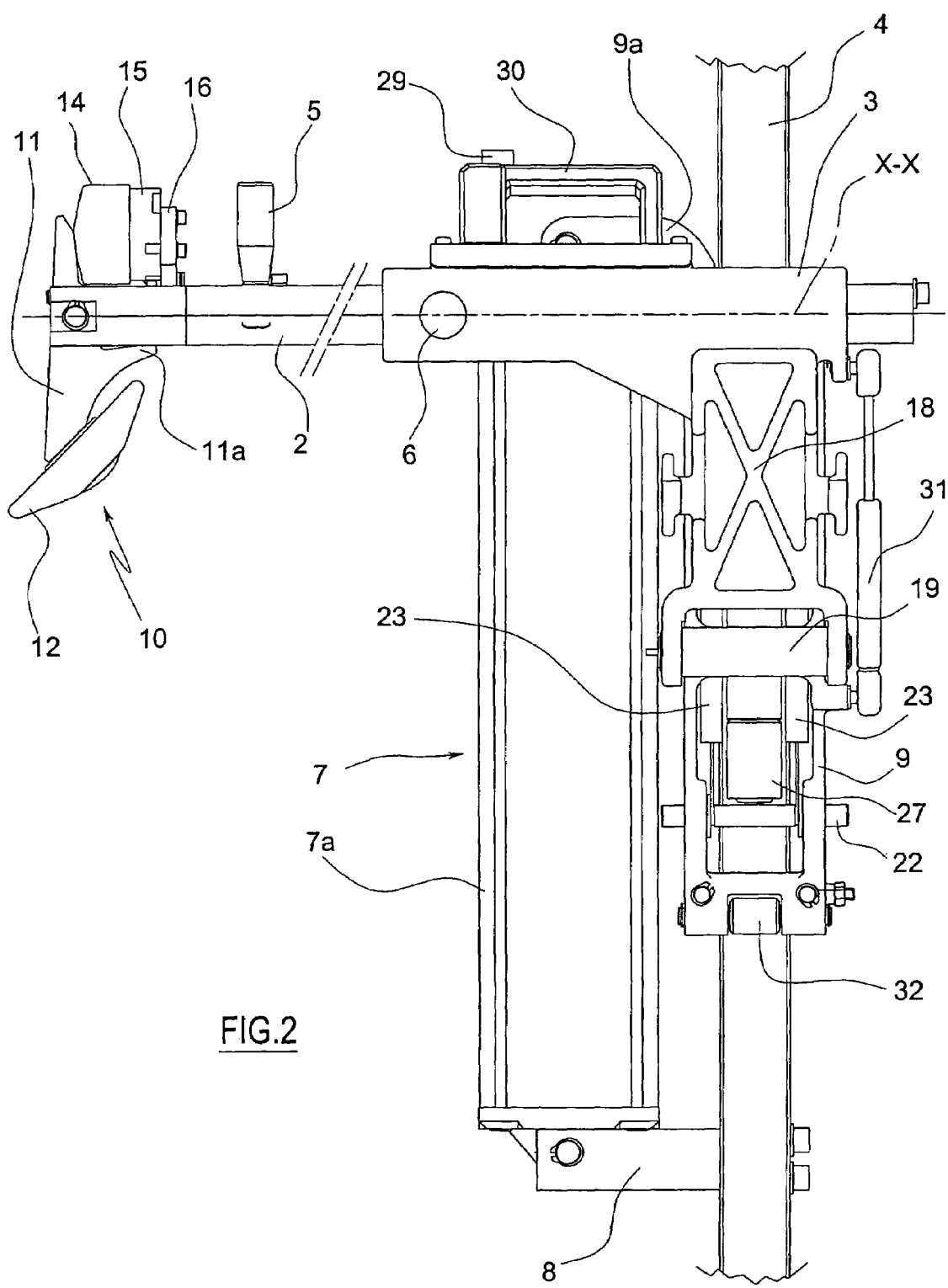
FIG. 2 shows a side view of the device of FIG. 1.

The actuation of the jacks 27 can be carried out through a button 29 arranged on a handle 30 fixed to the pipe 3. To avoid the frame 18 with annexed pipe 3 and arm 2 tilting down violently under its own weight after the fastening bodies 24 have been detached from the corresponding upper fastening pin 21, it is possible to foresee the use of damping means of the rotation speed about the rotation axis Y—Y, for example providing a pneumatic damping jack 31 associated at one end with the sled 9 at the articulation pin 13 and at the other end with the pipe 3 (FIG. 2).

Operatively, once the wheel having the tire with the bead to be broken has been fixed onto the rotary support and locking apparatus of the rim of the conventional type, the bead breaker tool 10 is positioned, acting on the handle 5 after having unlocked the locking/unlocking device 6 present on the pipe 3, at a distance from the post 4 such as to allow the disc 12 to reach the bead of the tire.

Having reached the optimal position for bead breaking, the sliding of the arm 2 in the pipe 3 is locked by acting on the device 6.

The tool 10 is moved closer to the bead of the tire through the actuation of the jack 7 that drags the sled 9 vertically along the post 4 and with it the pipe 3, the arm 2 and thus the tool 10.

The bead breaking occurs substantially in two steps: the first a thrusting step, in which the bead is detached from the edge of the rim to which it is attached through a thrust applied parallel to the axis of the wheel, the second a penetration step, in which the disc penetrates inside the tire positioning itself between the bead and the edge of the rim.

In the two steps, the tool 10 takes up the first thrusting configuration and the second penetration configuration, respectively.

The first thrusting configuration is ensured by the thrusting body 14 that is actuated in its extension position in contrast to the spring 17.

The second penetration configuration is ensured by the action of the spring 17 that, when the action of the thrusting body 14 has stopped, applies a thrust onto the nose 11a of the support body 11 to which the disc 12 is fixed, making it rotate about the pin 13 by a few degrees of course, the thrust stops its effects when the projection 11b goes into abutment against the end of the arm 2.

The degrees of oscillation of the tool 10, just like the spatial position of the disc 12 associated with it, are those of the prior art and therefore have not been described in detail.

At the end of the bead breaking of an entire side, for example the top, of the tire, the tilting means are actuated by pressing on the button 29 on the handle 30 fixed to the pipe 3.

The button 29 actuates the pair of jacks 27 that thrust apart the pins 21 and 22, which are free to slide in the pairs of slots 25 and 26, until they are detached from the pair of U-shaped recesses 24a of the fastening bodies 24.

After having detached the fastening bodies 24, the tilting frame 18, integral with the fastening bodies 24, is free to rotate about the pin 19 tilting down (or vice-versa, if one starts at the bottom side of the tire), where it shall attach to the lower pin 22 once the action of the jacks 27 has stopped, in virtue of the action applied by the return springs 23.

This makes it possible to operate immediately on the bead of the lower side of the tire without the need to re-establish the correct distance of the tool 10 from the post 4.

As can be appreciated from that which has been described, the bead breaker device according to the present invention allows the requirements to be satisfied and the drawbacks mentioned in the introductory part of the present description with reference to the prior art to be overcome.

Indeed, the bead breaker device according to the present invention is simple and cost-effective to make and allows effective bead breaking.

Moreover, the group formed from the actuation means of the tool and the tool itself is entirely housed at the end of the arm and it can also be associated with arms of conventional bead breaker devices, occupying little space and therefore being very practical.

Furthermore, said bead breaker device allows the bead of a tire to be broken on both sides without needing to tilt the wheel. Of course, a man skilled in the art can bring numerous modifications and variants to the bead breaker device described above in order to satisfy contingent and specific requirements, all of which are covered by the scope of protection of the invention, as defined by the following claims.

The invention claimed is:

1. A breaker device (1) comprising:
   an arm (2) which slides along a sliding axis (X—X) in a pipe (3), said arm (2) also supported to slide vertically on a post (4) projecting up from a base;
   an orientable bead breaker tool (10) rotatably engaged to an end of said arm (2);
   an actuating device (14, 15, 17) fixed on said arm (2) which moves said tool (10) between a first thrusting position and a second penetration position;
   wherein said actuating device (14, 15, 17) includes a thrusting body (14) abutting said tool (10) and an elastic element (17) having opposite ends respectively engaged between said arm (2) and said tool (10);
   wherein said thrusting body (14) moves said tool (10) to the thrusting position by rotating said tool (10) on said arm (2) in a first direction and said spring element moves said tool (10) to the second penetration position by rotating said tool (10) on said arm (2) in a second direction opposite to the first direction.

2. The bead breaker device (1) according to claim 1, wherein said thrusting body (14) is actuated by a cylinder-piston group (15) fixed to a plate (16) cantilevered from said sliding arm (2).

3. The bead breaker device (1) according to claim 2, wherein said cylinder-piston group (15) is a pneumatic jack.

4. The bead breaker device (1) according to claim 1, wherein said tool (10) comprises an oblong support body (11) rotatably abutting the end of said arm (2) and a disc (12) fixed to an end of said support body (11) for engagement with the bead of the tire.

5. The bead breaker device (1) according to claim 4, wherein the end of said support body (11) opposite the one engaged to the disc (12) abuts said thrusting body (14).

6. The bead breaker device (1) according to claim 4, wherein said support body (11) has a projection (11b) abuts against the end of said arm (2), when said tool (10) is in said penetration position.

7. The bead breaker device (1) according to claim 4, wherein said support body (11) is provided with a nose (11a) fixed to said elastic means (17).

8. The breaker device (1) according to claim 1, wherein said elastic means comprise a spring (17) having a first end inserted with a tight fit in a recess formed at the end of said arm (2) and arranged transversally to said sliding axis (X—X) of the arm (2).

9. The bead breaker device (1) according to claim 1 further comprising tilting means suitable for tilting said sliding arm (2) to the opposite side of said wheel, said tilting means allowing the rotation of said arm (2) about a rotation axis (Y—Y) parallel to and distal from the sliding axis (X—X).

10. The bead breaker device (1) according to claim 9, wherein said tilting means comprise a tilting frame (18) hinged at one end to a sled (9), associated so that it can slide vertically with said post (4), through an articulation pin (19) extending along said rotation axis (Y—Y) and at the other end associated with said pipe (3), engagement elements (21, 22, 23, 24) and disengagement elements (27) respectively suitable for locking said frame (18) in a work position and for unlocking said frame to allow it to be tilted.

11. The bead breaker device (1) according to claim 10, wherein said engagement means (21, 22, 23, 24) comprise an upper fastening pin (21) and a lower fastening pin (22) having the respective aces extending parallel and symmetrically to said rotation axis (Y—Y), said fastening pins (21, 22) each being slidably inserted in a respective pair of opposite slots (25, 26) formed on said sled (9) and extending vertically for a limited portion, at least one return spring (23) placed between the two fastening pins (21, 22) suitable for applying a force drawing them together, at least one fastening body (24) associated with said tilting frame (18) and suitable for alternately attaching with the ends of each fastening pin (21, 22).

12. The bead breaker device (1) according to claim 11, wherein said fastening body (24) is provided with a pair of U-shaped grooves (24a) suitable for engaging with the ends of said fastening pins (21, 22).

13. The bead breaker device (1) according to claim 11, wherein said disengagement means comprises a pair of jacks (27) fixed to said sled (9) and respectively cooperating with said upper fastening pin (21) and lower fastening pin (22) and able to be actuated in contrast to said at least one return spring (23) to disengage said fastening pins (21, 22) from said fastening body (24) allowing it to be tilted.

14. The bead breaker device (1) according to claim 13, wherein said jacks (27) are actuated through a button (29) arranged on a handle (30) fixed to said pipe (3).

15. The bead breaker device (1) according to claim 9 comprising damping means (31) of the rotation speed of the arm (2) about the rotation axis (Y—Y).

16. The bead breaker device (1) according to claim 15, wherein said damping means comprise a pneumatic jack (31).

* * * * *